United States Patent
Seidl

(10) Patent No.: US 10,689,008 B2
(45) Date of Patent: Jun. 23, 2020

(54) METHOD FOR ASSISTING A DRIVER OF A SINGLE-TRACK MOTOR VEHICLE IN ORDER TO DRIVE THROUGH A BEND SAFELY

(71) Applicant: Bayerische Motoren Werke Aktiengesellschaft, Munich (DE)

(72) Inventor: Josef Seidl, Dingolfing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 246 days.

(21) Appl. No.: 15/593,404

(22) Filed: May 12, 2017

(65) Prior Publication Data

US 2017/0247042 A1    Aug. 31, 2017

Related U.S. Application Data

(63) Continuation of application No. PCT/EP2015/075695, filed on Nov. 4, 2015.

(30) Foreign Application Priority Data

Dec. 11, 2014  (DE) .................. 10 2014 225 625

(51) Int. Cl.
*B60W 50/14* (2020.01)
*B60W 50/16* (2020.01)
(Continued)

(52) U.S. Cl.
CPC ...... *B60W 50/14* (2013.01); *B60W 30/18145* (2013.01); *B60W 50/16* (2013.01);
(Continued)

(58) Field of Classification Search
CPC ........... B60W 30/18145; B60W 50/16; B60W 50/085; B60W 2050/143; B60W 2050/146; B60W 2300/36; B60W 2510/182
See application file for complete search history.

(56) References Cited

U.S. PATENT DOCUMENTS

| 2009/0306856 A1 | 12/2009 | Fritz et al. |
| 2010/0230219 A1 | 9/2010 | Helf |

(Continued)

FOREIGN PATENT DOCUMENTS

| CN | 101208224 A | 6/2008 |
| CN | 101802436 A | 8/2010 |

(Continued)

OTHER PUBLICATIONS

DE102013225751—English Translation, 2013 (Year: 2013).*

(Continued)

*Primary Examiner* — Abby Y Lin
*Assistant Examiner* — Renee LaRose
(74) *Attorney, Agent, or Firm* — Crowell & Moring LLP

(57) ABSTRACT

A method is provided for assisting a driver of a single-track motor vehicle during a drive in order to drive through a bend safely. In the method, at least one current driving state variable and driver-specific driving dynamics variables are compared with an approaching driving situation and, if a danger threshold value is reached or exceeded, a warning signal is output. The current speed of the motor vehicle is sensed by a speed sensor and transmitted to a computer—and memory unit as the current driving state variable. Both previously reached inclined positions of the single-track motor vehicle and previously reached brake pressures and/or brake pressure gradients are stored by the computer-and-memory unit as the driver-specific driving dynamics vari- (Continued)

ables. In order to evaluate the approaching driving situation, a bend radius of a curve to be driven through next is determined via a navigation unit and is transmitted to the computer—and memory unit.

14 Claims, 1 Drawing Sheet

(51) Int. Cl.
 *B60W 30/18* (2012.01)
 *B60W 50/08* (2020.01)

(52) U.S. Cl.
 CPC ..... *B60W 50/085* (2013.01); *B60W 2050/143* (2013.01); *B60W 2050/146* (2013.01); *B60W 2300/36* (2013.01); *B60W 2510/182* (2013.01); *B60W 2520/06* (2013.01); *B60W 2520/18* (2013.01); *B60W 2540/043* (2020.02); *B60W 2552/30* (2020.02); *B60W 2554/00* (2020.02); *B60W 2556/50* (2020.02)

(56) References Cited

U.S. PATENT DOCUMENTS

| | | |
|---|---|---|
| 2010/0252370 A1 | 10/2010 | Raffin et al. |
| 2011/0209951 A1 | 9/2011 | Baumgartner et al. |
| 2012/0316699 A1 | 12/2012 | Filev et al. |
| 2013/0054049 A1 | 2/2013 | Uno |
| 2013/0328699 A1 | 12/2013 | Schramm et al. |

FOREIGN PATENT DOCUMENTS

| | | |
|---|---|---|
| CN | 101809310 A | 8/2010 |
| CN | 102112769 A | 6/2011 |
| CN | 102892657 A | 1/2013 |
| CN | 103429478 A | 12/2013 |
| DE | 198 43 395 A1 | 3/2000 |
| DE | 10 2005 048 542 A1 | 4/2007 |
| DE | 10 2007 053 274 A1 | 5/2009 |
| DE | 10 2012 209 518 A1 | 12/2012 |
| DE | 10 2012 201 802 A1 | 8/2013 |
| DE | 10 2012 011 171 A1 | 12/2013 |
| DE | 10 2013 225 751 A1 | 6/2015 |
| WO | WO 2013/117275 A1 | 8/2013 |
| WO | WO 2014/041155 A1 | 3/2014 |

OTHER PUBLICATIONS

DE102012201802—English translation, 2013 (Year: 2013).*
International Search Report (PCT/ISA/210) issued in PCT Application No. PCT/EP2015/075695 dated Jan. 27, 2016 with English translation (Four (4) pages).
German-language Written Opinion PCT/ISA/237) issued in PCT Application No. PCT/EP2015/075695 dated Jan. 27, 2016 (Five (5) pages).
German-language Search Report issued in counterpart German Application No. 10 2014 225 625.9 dated Oct. 9, 2015 with partial English translation (Twelve (12) pages).
Chinese-language Office Action issued in counterpart Chinese Application No. 201580052253.6 dated May 30, 2018 with English translation (11 pages).
Chinese-language Office Action issued in counterpart Chinese Application No. 201580045585.1 dated Jun. 4, 2018 with English translation (9 pages).

* cited by examiner

METHOD FOR ASSISTING A DRIVER OF A SINGLE-TRACK MOTOR VEHICLE IN ORDER TO DRIVE THROUGH A BEND SAFELY

CROSS REFERENCE TO RELATED APPLICATIONS

This application is a continuation of PCT International Application No. PCT/EP2015/075695, filed Nov. 4, 2015, which claims priority under 35 U.S.C. § 119 from German Patent Application No. 10 2014 225 625.9, filed Dec. 11, 2014, the entire disclosures of which are herein expressly incorporated by reference.

BACKGROUND AND SUMMARY OF THE INVENTION

A method is provided for assisting a driver of a single-track motor vehicle during a journey in order to safely drive through a bend. Furthermore, a driver assistance system for carrying out the method and the single-track motor vehicle which has the driver assistance system are provided.

DE 10 2012 209 518 A1 describes a driver assistance system for a vehicle which has a proactive power mode advice function in order to recommend a power mode to a driver as a function of the observations of the last driver actions which are determined by way of collected data. In this context, data which is collected from vehicle sources and non-vehicle sources can provide resources from which the properties and preferences of the driver can be determined.

However, such systems are suitable only to an inadequate degree for use in single-track motor vehicles for assisting a driver for safely driving through a bend.

An object which is to be achieved by at least some embodiments is to provide a method which assists a driver of a single-track motor vehicle, with the result that bends which are to be driven through during a journey can be coped with safely, and a risk of falling is reduced. Further objects are to provide a driver assistance system for carrying out the method, and a single-track motor vehicle having the driver assistance system.

These objects are achieved by a method and a driver assistance system, as well as a vehicle equipped with the driver assistance system, in accordance with embodiments of the present invention.

The method described here is suitable for assisting a driver of a single-track motor vehicle during a journey for safely driving through a bend (curve in the road). In the method, at least one current driving state variable and at least one driver-specific driving dynamics variable are compared with an imminent driving situation, and when a danger threshold value is reached or exceeded a warning signal is output.

In this context, in particular, the current speed of the motor vehicle is recorded as a current driving state variable by use of a speed sensor and is transmitted to a computing and memory unit. The speed sensor can be, for example, a wheel speed sensor. Alternatively or additionally, it is possible that a current oblique (inclined) position of the single-track motor vehicle is transmitted as a current driving state variable to the computing and memory unit.

At least previously adopted oblique positions of the single-track motor vehicle are stored as driver-specific driving dynamic variables by the computing and memory unit. The term "previously adopted" oblique positions can be understood to mean, for example, all oblique positions adopted since the start of the current journey. Furthermore, it is possible that even positions adopted from previous journeys are also included. The oblique positions of the single-track motor vehicle are preferably detected by one or more inclination sensors and transmitted by way of inclination sensor signals to the computing and memory unit which stores and evaluates the inclination sensor signals.

In the method described here for assisting the driver of the single-track motor vehicle in order to safely drive through a bend, it is of particular advantage, compared to known methods, that oblique positions of the motor vehicle adopted in the past are stored as driver-specific driving dynamics variables by the computing and memory unit, and these data are included in the comparison of current driving state variables and the driver-specific driving dynamics variables with an imminent driving situation in order to evaluate a danger potential. As a result, in the case of single-track motor vehicles the danger of a fall is minimized.

According to a further embodiment, previously adopted brake pressures and/or brake pressure gradients are stored as driver-specific driving dynamics variables by the computing and memory unit. The term brake pressure can be understood here to mean the pressure in a hydraulic system of a brake system when a brake of the motor vehicle is activated. The brake pressure gradient represents a driver-specific characteristic variable which maps a chronological resolution of the application of the brake by the driver. The adopted brake pressures or brake pressure gradients are preferably detected by a brake pressure sensor and transmitted by way of brake pressure signals to the computing and memory unit which stores and evaluates the brake pressure signals.

In order to evaluate the imminent driving situation, in particular the bend radius of the next bend which is to be driven through during the journey, the bend radius is determined by use of a navigation unit and transmitted to the computing and memory unit. The navigation unit can include, for example, a location-determining unit such as e.g. a GPS unit, and a map data unit which contains e.g. map data such as bend radii, etc. The computing and memory unit processes the received sensor signals and data, i.e. those from the current driving state variables, the driver-specific driving dynamics variables and those relating to the imminent driving situation, and when the danger threshold value is reached or exceeded, it causes the warning signal to be output. The result is that the driver of the single-track motor vehicle can be warned about the dangerous situation and react appropriately.

According to a further embodiment, one or more of the following driver-specific driving dynamics variables are stored by the computing and memory unit: previously driven-through bend radii, previously reached cornering speeds and/or previously adopted braking points before bends.

Furthermore, according to one preferred embodiment, in order to evaluate the imminent driving situation, a current traffic density of the route being driven on is interrogated. For example, the current traffic density can be interrogated online via a navigation portal, wherein the received data are evaluated by the computing and memory unit and taken into account in the evaluation of the imminent driving situation, e.g. in such a way that when there is a high traffic volume the warning signal is output earlier.

According to one further embodiment, the driver-specific driving dynamics variables are determined from the beginning of the current journey and are stored by the computing and memory unit. Alternatively or additionally, the driver-specific driving dynamics variables can also be stored over multiple journeys by the computing and memory unit. It is particularly advantageous if the stored driver-specific driving dynamics variables are assigned to a driver profile. For example, before the start of a journey the driver can sign on by use of an identification unit, with the result that driver-specific driving dynamics variables to be stored can be assigned to the driver profile.

According to a further embodiment, the driver of the single-track motor vehicle can select whether the driver-specific driving dynamics variables are generated for the first time at the start of the current journey or whether a driver profile which is assigned to the driver and which contains driver-specific driving dynamics variables from preceding journeys is to be accessed.

The warning signal can be output, for example, in an optical and/or acoustic form. The optical display can be provided, for example, via a light signal in the field of vision of the driver. The warning signal is preferably output acoustically by use of a warning tone which can be output, for example, via a loudspeaker in the vehicle or in the driver's helmet.

Alternatively or additionally, the warning signal can be output in a haptic form. For example, when the warning signal is output a vibration can take place in the one or more areas of the motor vehicle: in the throttle handle, in the pedal, in the seat, in the fuel tank. Furthermore, according to one embodiment the warning signal can be output haptically via one or more vibration elements in the driver's helmet, which vibration element can be connected to the computing and memory unit, e.g., via a Bluetooth link.

According to a further embodiment, the warning signal is output in multiple stages. This means that the intensity of the warning signal can rise over two or more stages if the driver does not react appropriately to the warning signal. For example, in the case of an acoustic warning the volume of the warning signal can increase, and in the case of a visual warning the color of the light signal can change or a frequency of a flashing indicator light can increase. In the case of a haptic warning, the frequency or intensity of a vibration can increase.

According to a further embodiment, the warning signal is output in such a way that a remaining reaction time for the successful avoidance of an upcoming dangerous situation is between 0.5 and 2.0 seconds. The minimum remaining reaction time for the successful avoidance of the upcoming dangerous situation can particularly preferably be set by the driver before the start of the journey. It is therefore possible, for example, to avoid a situation in which a driver who is set on sporty driving is disrupted by a warning signal which is triggered too early, or it is ensured that an unsafe driver is warned early enough.

Furthermore, a driver assistance system for carrying out the method described here is provided. The driver assistance system can include here the computing and memory unit which is described above and below and can access said unit.

Furthermore, a single-track motor vehicle is provided which has the driver assistance system described here. The single-track motor vehicle can be embodied, for example, as a motor bike or as a scooter.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and figures, identical or identically acting components can be respectively provided with the same reference symbols.

Figure 1:
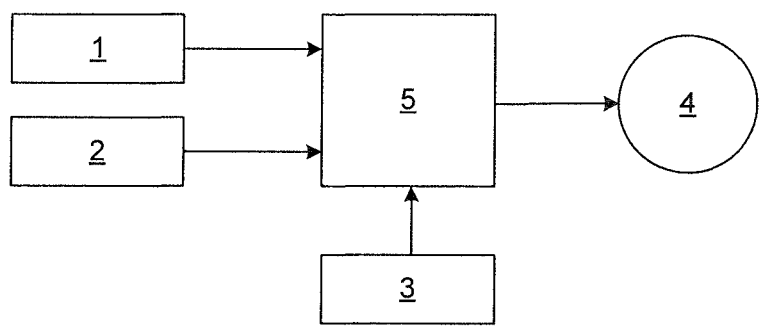
FIG. 1 is a schematic illustration of a method described here for assisting a driver of a single-track motor vehicle in order to safely drive through a bend according to one exemplary embodiment.

FIG. 1 shows a schematic illustration of a method for assisting a driver of a single-track motor vehicle during a journey in order to safely drive through a bend according to one exemplary embodiment.

In the method, at least one current driving state variable 1 and a multiplicity of driver-specific driving dynamics variables 2 are compared with an imminent driving situation 3, and when a danger threshold value is reached or exceeded a warning signal 4 is output. The current driving state variable 1 is generated, for example, as a sensor signal by one or more sensors of the motor vehicle and is transmitted to a computing and memory unit 5. The driver-specific driving dynamics variables 2 are transmitted, for example, as data generated in the motor vehicle, and/or as data which are generated outside the motor vehicle, to the computing and memory unit 5. The imminent driving situation 3 is transmitted, for example, as data generated outside the motor vehicle, for example data which is received by way of a navigation unit of the vehicle, to the computing and memory unit 5. The computing and memory unit 5 processes the received sensor signals and data, and causes the warning signal 4 to be output when a danger threshold value is reached or exceeded.

Figure 2:
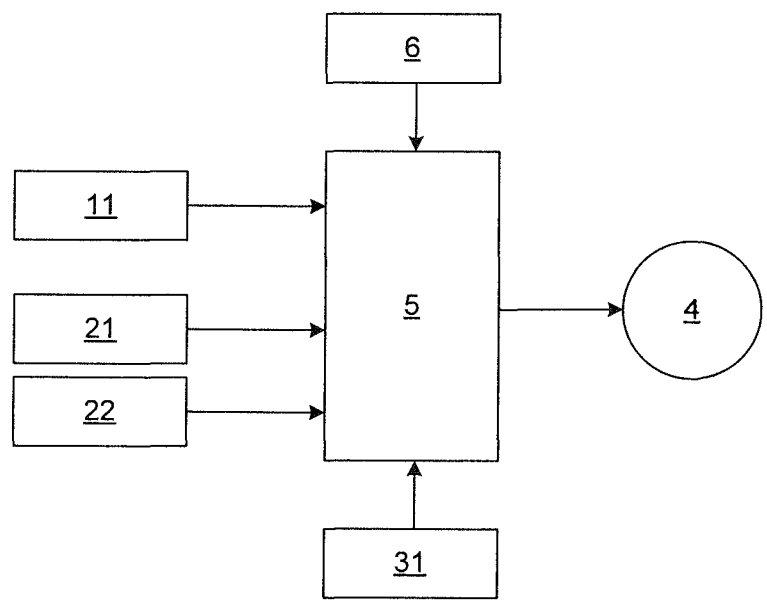
FIG. 2 is a schematic illustration of a method (described here) according to a further exemplary embodiment.

FIG. 2 illustrates a further illustration of a method described here. In this context, the current speed of the motor vehicle is recorded as a current driving state variable 1 by way of a speed sensor 11 and transmitted to a computing and memory unit 5.

Both the previously adopted oblique positions of the single-track motor vehicle, which are detected by an inclination sensor 21 and transmitted by way of inclination sensor signals to the computing and memory unit 5, and the previously adopted brake pressures and brake pressure gradients which are detected by a brake pressure sensor 22 and transmitted by way of brake pressure signals to the computing and memory unit 5, are stored and evaluated by the computing and memory unit 5.

In order to evaluate the imminent driving situation, a bend radius of the bend which is to be driven through next during the journey is obtained by way of a navigation unit 31, and the resulting navigation data is transmitted to the computing and memory unit 5 which evaluates the received data and sensor signals and compares them with a calculated danger threshold value. When the danger threshold value is reached or exceeded, the warning signal 4 is output in an optical, acoustic and/or haptic form, in order to alert the driver to the dangerous situation and to bring about a reaction in order to avoid the danger. The navigation unit 31 can have, for example, a location-determining unit (e.g. GPS) and a map data unit (with map data such as e.g. bend radii).

Furthermore, for example, the current oblique position of the single-track motor vehicle, which position is detected by an inclination sensor, can be transmitted as a current driving state variable 1 to the computing and memory unit 5.

For example, previously driven-through bend radii, previously adopted cornering speeds and/or previously adopted braking points before bends can be stored as further driver-specific driving dynamics variables 2 by the computing and memory unit 5.

Furthermore, it is possible that the driver of the single-track motor vehicle can sign on by way of an identification unit 6 before the start of a journey. If the driver has already signed on at least once in the past and a personalized driver profile has been subsequently stored, this driver profile can be assigned in the case of renewed signing on before a new journey. The driver-specific driving dynamics variables 2 can advantageously be stored by the computing and memory unit 5 over a plurality of journeys, and stored in the driver profile.

The driver of the single-track motor vehicle can particularly preferably select, before the start of a journey, whether the driver-specific driving dynamics variables 2 are generated for the first time at the start of the current journey or whether the driver profile which is assigned to the driver and which contains driver-specific driving dynamics variables 2 from preceding journeys is to be accessed.

Alternatively or additionally, the exemplary embodiments which are shown in the figures can have further features according to the embodiments of the general description.

LIST OF REFERENCE NUMBERS

1 Current driving state variable
2 Driver-specific driving dynamics variables
3 Imminent driving situation
4 Warning signal
5 Computing and memory unit
6 Identification unit
11 Speed sensor
21 Inclination sensor
22 Brake pressure sensor
31 Navigation unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting a driver of a single-track motor vehicle during a journey in order to safely drive through a bend, the method comprising the acts of:
    comparing at least one current driving state variable and driver-specific driving dynamics variables with an imminent driving situation, and when a danger threshold value is reached or exceeded outputting a warning signal,
    wherein
        a current speed of the motor vehicle is recorded as a current driving state variable by use of a speed sensor and is transmitted to a computing and memory unit,
        both previously adopted oblique positions of the single-track motor vehicle and previously adopted brake pressures and/or brake pressure gradients are stored as driver-specific driving dynamics variables by the computing and memory unit,
    in order to evaluate the imminent driving situation, a bend radius of a bend which is to be traveled on next is determined by use of a navigation unit and transmitted to the computing and memory unit,
    the previously adopted oblique positions are detected by an inclination sensor and transmitted via inclination sensor signals to the computing and memory unit which stores and evaluates the inclination sensor signals, and
    the previously adopted brake pressures and/or brake pressure gradients are detected by a brake pressure sensor and transmitted via brake pressure signals to the computing and memory unit which stores and evaluates the brake pressure signals.

2. The method as claimed in claim 1, wherein
one or more of the following driver-specific driving dynamics variables are stored by the computing and memory unit: previously driven-through bend radii, previously reached cornering speeds and/or previously adopted braking points before bends.

3. The method as claimed in claim 1, wherein
a current oblique position of the single-track motor vehicle is transmitted to the computing and memory unit as a current driving state variable.

4. The method as claimed in claim 1, wherein,
in order to evaluate the imminent driving situation, a current traffic density of the route being driven on is interrogated.

5. The method as claimed in claim 1, wherein
the driver-specific driving dynamics variables are determined from the beginning of the current journey and are stored by the computing and memory unit.

6. The method as claimed in claim 1, wherein
the driver-specific driving dynamics variables are stored by the computing and memory unit over a plurality of journeys and are assignable to a driver profile, and
before the start of a journey the driver can sign on via an identification unit and be assigned to a stored driver profile.

7. The method as claimed in claim 1, wherein
the driver of the single-track motor vehicle can select whether the driver-specific driving dynamics variables are generated for the first time at the start of the current journey or whether a driver profile which is assigned to the driver and which contains driver-specific driving dynamics variables from preceding journeys is to be accessed.

8. The method as claimed in claim 1, wherein the warning signal is output in multiple stages.

9. The method as claimed in claim 1, wherein the warning signal is output in an optical and/or acoustic form.

10. The method as claimed in claim 1, wherein the warning signal is output in a haptic form.

11. The method as claimed in claim 1, wherein
the warning signal is output such that a remaining reaction time for the successful avoidance of an upcoming dangerous situation is between 0.5 and 2.0 seconds.

12. The method as claimed in claim 11, wherein
a minimum remaining reaction time for the successful avoidance of the upcoming dangerous situation is settable by the driver before the start of the journey.

13. A driver assistance system for carrying out the method as claimed in claim 1.

14. A single-track motor vehicle having the driver assistance system as claimed in claim 13.

* * * * *